(12) United States Patent
Ramminger et al.

(10) Patent No.: US 10,315,234 B2
(45) Date of Patent: *Jun. 11, 2019

(54) METHOD FOR CONDITIONING A POWER-GENERATING CIRCULATORY SYSTEM OF A POWER PLANT

(71) Applicant: FRAMATOME GMBH, Erlangen (DE)

(72) Inventors: Ute Ramminger, Roth (DE); Joerg Fandrich, Obermichelbach (DE); Fernando-Mario Roumiguiere, Erlangen (DE)

(73) Assignee: Framatome GmbH, Erlangen (DE)

( * ) Notice: Subject to any disclaimer, the term of this patent is extended or adjusted under 35 U.S.C. 154(b) by 1277 days.

This patent is subject to a terminal disclaimer.

(21) Appl. No.: 14/104,104

(22) Filed: Dec. 12, 2013

(65) Prior Publication Data

US 2014/0102481 A1  Apr. 17, 2014

Related U.S. Application Data

(63) Continuation of application No. PCT/EP2013/053921, filed on Feb. 27, 2013.

(30) Foreign Application Priority Data

Feb. 28, 2012 (DE) .................. 10 2012 203 010

(51) Int. Cl.
*B08B 9/032* (2006.01)
*C23F 11/14* (2006.01)
(Continued)

(52) U.S. Cl.
CPC ............ *B08B 9/032* (2013.01); *C23F 11/141* (2013.01); *F22B 37/483* (2013.01); *F22B 37/56* (2013.01);
(Continued)

(58) Field of Classification Search
None
See application file for complete search history.

(56) References Cited

U.S. PATENT DOCUMENTS 1,393,800 A * 10/1921 Lillie .................. F22B 37/54
                                                        122/1 R
4,975,219 A   12/1990 Sato et al.
(Continued)

FOREIGN PATENT DOCUMENTS

DE         107962 A1     8/1974
DE         2450253   *   5/1975   ............. F01D 25/00
(Continued)

OTHER PUBLICATIONS

DE2405253 English Translation, accessed on Sep. 2015.*
(Continued)

*Primary Examiner* — Eric W Golightly
*Assistant Examiner* — Arlyn I Rivera-Cordero
(74) *Attorney, Agent, or Firm* — Laurence A. Greenberg; Werner H. Stemer; Ralph E. Locher

(57) ABSTRACT

A method for conditioning the circulatory system (1) of a power plant is especially suited for a nuclear power plant. An amine, which is a film-forming agent, is metered into the working medium circulating in the circulatory system. The film-forming agent forms a hydrophobic film on the surfaces of the circulatory system. During the process, the concentration of the film-forming agent is monitored in at least one measuring point by way of measurement, and metering of the film-forming agent is stopped once its concentration in the working medium has reached a value of 1 ppm to 2 ppm in at least one measuring point M1.

12 Claims, 3 Drawing Sheets

(51) Int. Cl.
  *F22B 37/56* (2006.01)
  *F22B 37/48* (2006.01)
  *G21C 15/28* (2006.01)
  *G21C 17/022* (2006.01)
  *G21D 1/00* (2006.01)

(52) U.S. Cl.
  CPC ......... *G21C 15/28* (2013.01); *G21C 17/0225* (2013.01); *G21D 1/00* (2013.01); *Y02E 30/40* (2013.01)

(56) References Cited

U.S. PATENT DOCUMENTS

| | | | | |
|---|---|---|---|---|
| 4,999,161 | A * | 3/1991 | Pierce | C23F 11/173 252/392 |
| 5,026,523 | A | 6/1991 | Taya | |
| 5,587,025 | A | 12/1996 | Jevec et al. | |
| 2014/0102482 | A1 * | 4/2014 | Ramminger | C23F 11/141 134/18 |

FOREIGN PATENT DOCUMENTS

| | | |
|---|---|---|
| DE | 3904733 A1 | 8/1989 |
| DE | 69007822 T2 | 7/1994 |
| EP | 0807696 A1 | 11/1997 |
| EP | 0902232 A1 | 3/1999 |
| JP | H08299968 A | 11/1996 |
| JP | 2003343804 A | 12/2003 |
| JP | 2008190933 A | 8/2008 |
| JP | 2008250592 A | 10/2008 |
| JP | 2011033301 A | 2/2011 |

OTHER PUBLICATIONS

JP2011033301 English Translation, accessed on Sep. 2015.*
Wang Yaoxi, "To Control Corrosion of System with Amine", Electric Technology, No. 5, Dec. 31, 1983, pp. 64-66.
Zhang Yufu "Anticorrosion Technology for Shut-down Thermal Power Equipment by Using Filming Amines", China Power, vol. 34, No. 6, Jun. 30, 2001, pp. 28-30, p. 80—English abstract.

* cited by examiner

METHOD FOR CONDITIONING A POWER-GENERATING CIRCULATORY SYSTEM OF A POWER PLANT

CROSS-REFERENCE TO RELATED APPLICATION

This application is a continuation, under 35 U.S.C. § 120, of copending international application No. PCT/EP2013/053921, filed Feb. 27, 2013, which designated the United States; this application also claims the priority, under 35 U.S.C. § 119, of German patent application No. DE 10 2012 203 010.7, filed Feb. 28, 2012; the prior applications are herewith incorporated by reference in their entirety.

BACKGROUND OF THE INVENTION

Field of the Invention

The invention relates to a method for conditioning a power-generating circulatory system of a power plant. By way of example, such a circulatory system should be understood to mean the primary and secondary circuit of a pressurized water reactor, the coolant circuit of a boiling water reactor and the steam circuit of a conventional power plant. Here, the term "conditioning" should be understood to mean a measure by means of which the surfaces of the components of the circulatory system can be protected from corrosion. When surfaces are mentioned, this should be understood to mean, on the one hand, the inner surfaces of e.g. lines, heat exchangers and containers and, on the other hand, surfaces of components such as turbine blades around which a work medium (water, steam) of the circulatory system flows. By way of example, German published patent application DE 2625607 and German patent DD 107962 describe methods in which film-forming amines (FFA) are metered into the secondary circuit or the water/steam circuit of pressurized water reactors during power operation.

The object of conditioning of the type in question is to generate a thin film on the surfaces which is as contiguous as possible, with the thickness of at most one to two molecule layers. However, conventional methods result in the risk in this context that thicker FFA deposits are formed, which, on the one hand, interfere with the process operation, by virtue, for example, of reducing heat transport in steam generators or other heat exchangers or narrowing flow cross sections. Moreover, there is the risk of parts of the deposits detaching and damaging turbine blades or adversely affecting mechanical filter installations and ion exchangers, so that the latter two have to be replaced.

SUMMARY OF THE INVENTION

It is accordingly an object of the invention to provide a method of conditioning of a power-generating circulatory system of a power plant which overcome the above-mentioned disadvantages of the heretofore-known devices and methods of this general type.

With the foregoing and other objects in view there is provided, in accordance with the invention, a method of cleaning and conditioning a circulatory system of a power plant, in particular a water/steam circuit of a nuclear power plant. The method comprises:

adding an amine as a film-forming agent to a work medium circulating in the circulatory system, for the film-forming agent to form a hydrophobic film on surfaces of the circulatory system;

monitoring a concentration of the film-forming agent by conducting measurements at a measurement point during a duration of the method; and terminating the step of adding the film-forming agent when the concentration of the film-forming agent in the work medium has reached a value between 1 ppm and 2 ppm at the measurement point.

In other words, the above and other objects are achieved with a method of the type mentioned at the outset, in that preferably during power operation an amine is added to the work medium circulating in the circulatory system, which amine acts as film-forming agent and forms a hydrophobic film on the surfaces of the circulatory system which are in contact with the work medium. Here, the method is carried out in such a way that there is control in respect of the concentration of the film-forming agent or the progress of the film formation at practically any time during the method. This is achieved by virtue of the fact that the concentration of the film-forming agent is monitored at at least one measurement point by measurements during the duration of the method. Here, the film-forming agent is metered in such a way that in the water phase of the water/steam circuit, at least in the steam generator feed water, there is a concentration of 1 to 2 ppm, preferably of 1 to 1.5 ppm. If work is conducted within these boundaries, in particular with at most up to 1.5 ppm of film-forming agent, the formation of thick layers of the film-forming agent can be avoided. It was moreover found that, in many cases, an adequate film is already present on the surfaces when the aforementioned concentration or target concentration has been reached.

However, a single-layer or substantially mono-molecular film is obtained with greater reliability on the surfaces, substantially covering the latter completely, if the method is continued under the aforementioned premises until the concentration of the film-forming agent at a constant metering rate at a plurality of measurement points distributed over the water/steam circuit remains constant averaged over time at a plurality of measurement points (M1, M2, M3), i.e. if an equilibrium concentration sets in at the measurement points. The mean averaged over time is understood to mean the profile of the trend which emerges if fluctuations due to the measurement technologies have been eliminated by suitable methods of conventional error calculation.

The measurement points already mentioned above are, in the case of a water/steam circuit, distributed such that at least one measurement point is situated in the one-phase region and at least one measurement point is situated in the two-phase region of the circuit.

In a preferred variant, the method is carried out in such a way that it can be possible, at practically any time during the method, to control not only the concentration of the film-forming agent or the progress of the film formation, but also the effects of the film-forming agent metering in respect of impurities mobilized thereby. This is achieved by virtue of the fact that the concentration of at least one impurity and the concentration of the film-forming agent are measured during the duration of the method and the concentration of the film-forming agent is modified depending on the concentration of at least one impurity. This ensures that, at any time during the method, predetermined guide values and limits of an impurity, in particular a corrosively acting ionic impurity such as e.g. chloride or sodium ions, are maintained or not exceeded. Moreover, it is possible to effectively prevent an impurity, immobilized at a locally restricted surface region of the water/steam circuit, from quickly being mobilized by metering of the film-forming agent and being distributed in large quantities in the whole circuit.

As a countermeasure to an increase in the concentration of an impurity, the metering rate of the film-forming agent can be reduced or interrupted, in particular in view of maintaining limits. A further countermeasure consists of reducing the concentration of impurities that have passed into the work medium. This preferably occurs by virtue of the water/steam circuit being purged and, in the process, particulate impurities, inter alia, being removed by blowing down. This measure preferably occurs, for example for reasons of procedural economy, directly following an interruption of the metering of the film-forming agent. It is also feasible that, in order to remove impurities from the water/steam circuit, filters are employed, for example the filter installations of the condensate cleaning system, which is part of the power plant.

Monoamines with a hydrocarbyl comprising 8 to 22 carbon atoms were found to be particularly effective for both the cleaning effect and for the film formation, with octadecylamine being particularly suitable in this case. Monoamines of the present type are available as waxy substance at room temperature. Conventional emulsions produced therefrom usually contain relatively large amounts of organic emulsifiers, which can have damaging effects in the water/steam circuit. Therefore, the FFA is preferably employed in the pure form in the method according to the invention, namely as an aqueous emulsion without the addition of emulsifiers, which can be obtained by pure mechanical mixing under the application of increased temperature.

Other features which are considered as characteristic for the invention are set forth in the appended claims.

Although the invention is illustrated and described herein as embodied in a method for conditioning a power-generating circulatory system of a power plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
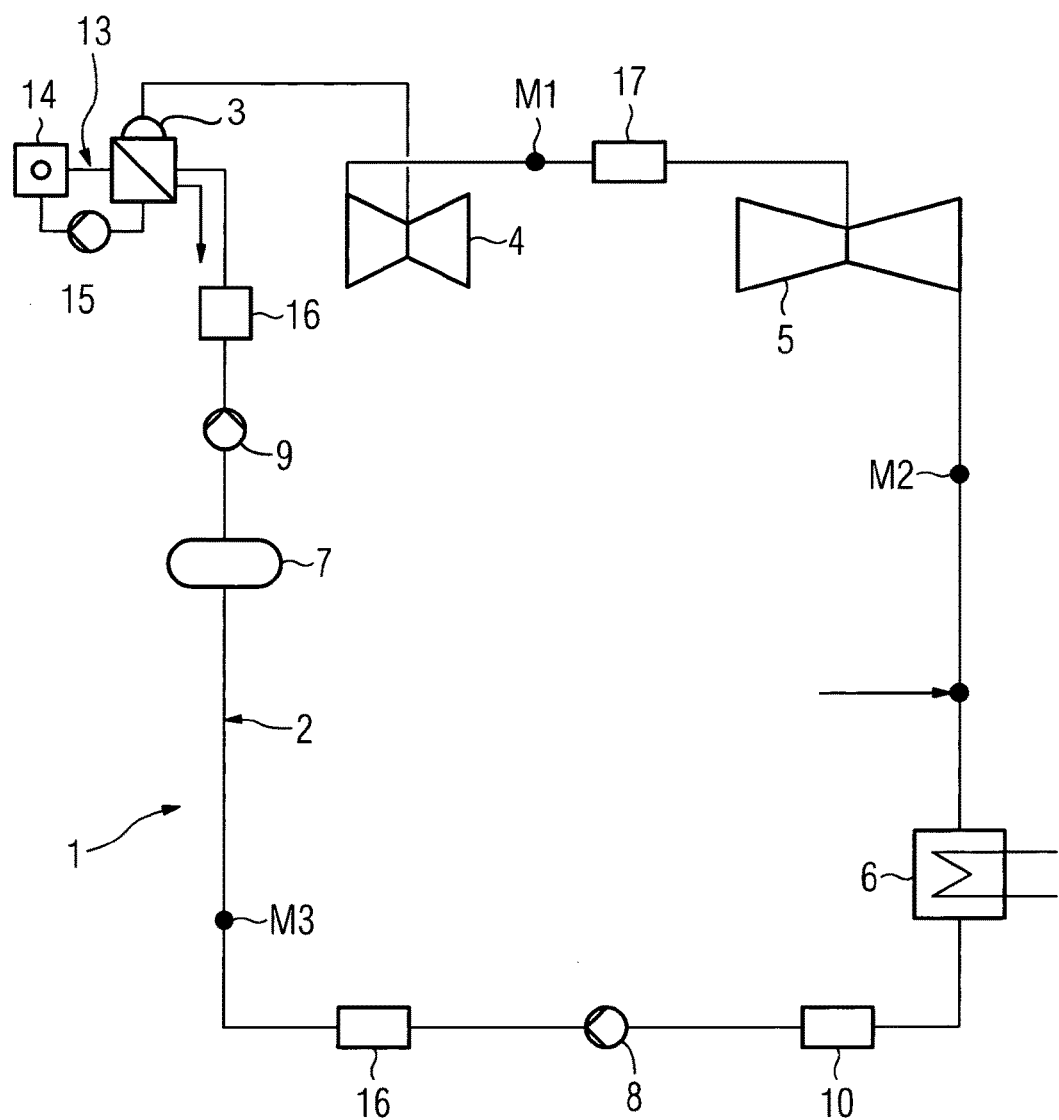
FIG. 1 shows, in a very schematic view, the water/steam circuit of a pressurized water reactor (PWR)

Referring now to the figures of the drawing in detail and first, particularly, to FIG. 1 thereof, there is shown an exemplary circulatory system, in the form of a water/steam circuit 1 (abbreviated WSC in the following text) of a pressurized water reactor (PWR). The circuit comprises a piping system 2, a plurality of steam generators 3, normally a plurality of turbines, for example a high-pressure (HP) turbine 4 and a low-pressure (LP) turbine 5, a water separator intermediate superheater 17 between the HP and LP turbines, a condenser 6, a feed water container 7, a condensate pump 8 arranged between the condenser 6 and the feed water container 7, a plurality of feed water preheaters 16 and a feed water pump 9 arranged between the feed water container 7 and the steam generator. Moreover, downstream of the condenser 6, there is a condensate cleaning system 10, which can comprise mechanical filters and, likewise, ion exchangers. On the primary side, the steam generator 3 is connected to the primary circuit 13 of the nuclear reactor, which comprises the reactor pressure container 14 and a main coolant pump 15.

As mentioned above, the cleaning and conditioning method is preferably carried out during power operation. This also comprises phases during the startup and shutdown of the power plant. In the exemplary embodiment described below, the conditioning of the water/steam circuit or the metering of a film-forming amine (abbreviated to FFA in the following), namely octadecylamine (ODA), is carried out just before shutting down the nuclear reactor. The continuous monitoring of concentrations or concentration changes in FFA and impurities (see step II in FIG. 3), carried out from the start of the method, is brought about by a plurality of measurement points arranged at different positions within the WSC 1. Some of these measurement points M1, M2, M3 are depicted in FIG. 1 in an exemplary manner.

The film-forming agent may be metered in at any expedient location within the circulatory system. Here, the injection point is illustrated in FIG. 1 by way of the arrow just upstream of the condenser 6.

As a result of the surfactant-like properties of the ODA (octadecylamine), there is a mobilization of impurities from the start of the FFA metering. Thus, as already mentioned above, limits which may not be exceeded are set for the concentration of these impurities. In the case of ionic impurities, the concentration is measured directly, i.e. in relation to a very specific ion with known wet-chemical or physical-chemical measurement methods. However, the concentration can also be determined indirectly, i.e. by the increase in the electrical conductivity of the work medium caused by the mobilization or the passage of ions into the work medium. The measurement methods used in the process are well known to a person skilled in the art, and so these do not have to be discussed in detail. A further parameter important for carrying out the method in a controlled manner is the FFA or ODA concentration in the work medium—the water present in the WSC.

Finally, as a result of the ODA metering, corrosion products are also released, i.e. very fine particles of magnetite, which adhere to the surfaces and, as a result of the effect of ODA, go into colloidal solution. Since the majority of corrosion products can be traced back to metal oxides such as magnetite, it is normally sufficient only to carry out measurements in this respect. In the process, e.g. the iron content of the feed water is determined in a known fashion and, as a result of the known stoichiometry of the magnetite, the concentration thereof in the feed water is deduced. Finally, the pH-value is also monitored in order to prevent corrosion of the metallic components of the WSC 1. It is also feasible for the TOO (total organic carbon) value to be monitored in order to exclude a possible decomposition of the added ODA at the prevalent conditions, i.e. temperatures of over 250°, and hence the formation of decomposition products which could act corrosively.

The ODA metering or the amount of ODA metered into the WSC 1 per unit time is—on the basis of the measurement data established at the measurement points M1 to M3 regulated such that the concentrations of the type of impurities that have passed into the work medium due to the ODA metering remain below predetermined limits (see step III in FIG. 3). Moreover, by monitoring the aforementioned concentration values, it is already possible to identify a trend in a timely fashion such that a countermeasure can be introduced in a timely fashion. By way of example, the metering-in of ODA can be reduced or interrupted. Here, it should be noted that a change in metering only has an effect a couple of hours later due to the volume of water and the length of the piping of the WSC 1. However, this time delay plays practically no role in a method according to the invention since a change of a critical concentration value is identified by permanent whole control at a plurality of measurement points M1 to M3, long before said value has reached its critical limit.

In order to have an indication of which ODA amounts are required for a given WSC 1, it is expedient to estimate what approximate amount of ODA is necessary to generate a mono-molecular hydrophobic film on the surfaces of the WSC. This amount can then still be multiplied by a factor in order to take into account the roughness of the surfaces, which, after all, is significant in the case of sub-microscopic observation, and effects which use up ODA, for example the degree of contamination of the WSC. On the basis of this estimate, it is possible, in the case of a given ODA metering rate, to specify a defined period of time in which an ODA film which completely covers the surfaces, e.g. a mono-molecular ODA film, has been created.

Figure 3:
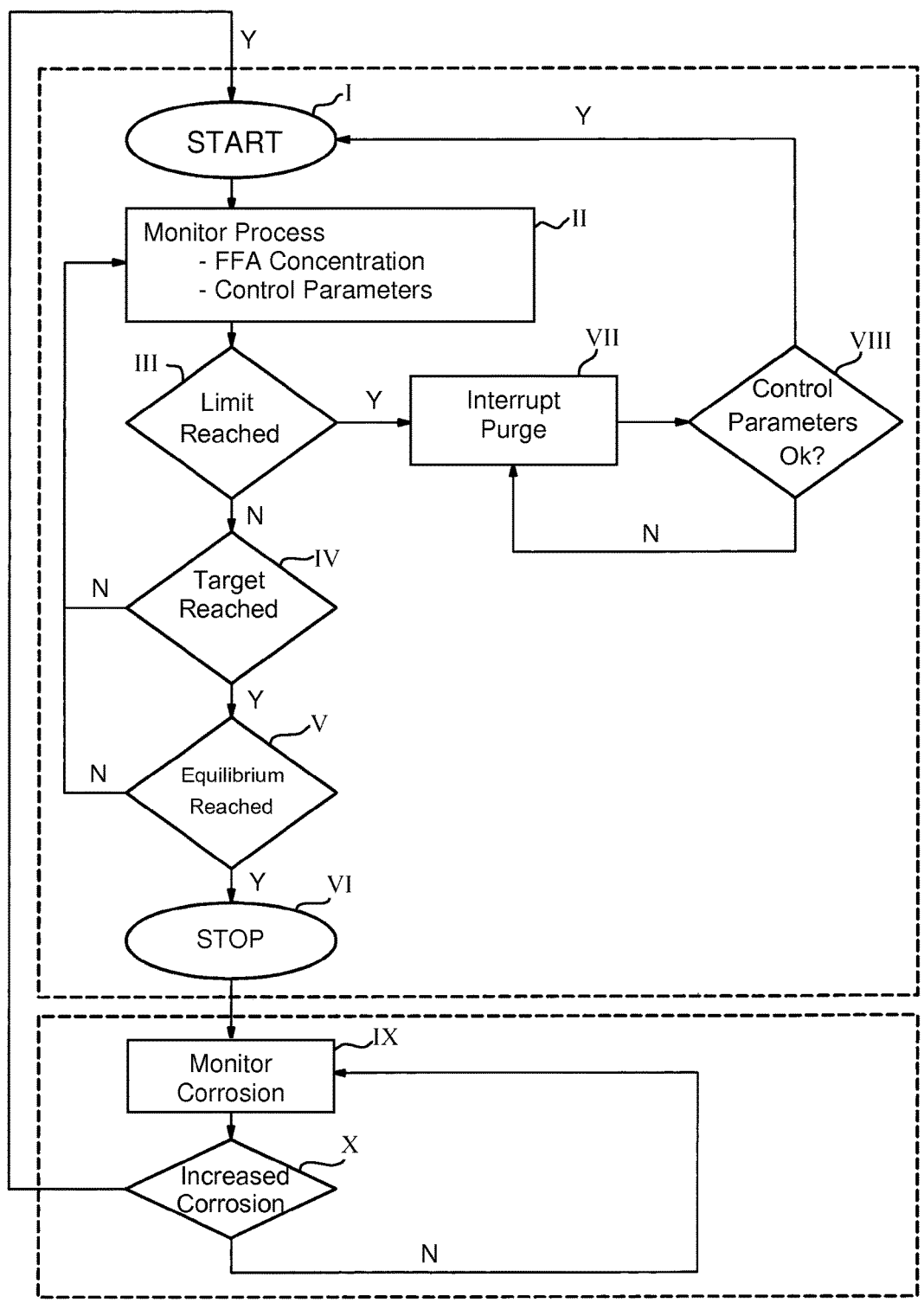
FIG. 3 shows a flowchart illustrating a conditioning process.

When a critical concentration of an impurity is reached (step III in FIG. 3), an effective measure for reducing the critical concentration lies in interrupting the FFA metering and a subsequent purging or blowing down, during which the impurity is removed from the WSC (step VII in FIG. 3). In the process, there is continuous monitoring of whether the installation-specific control parameters or concentrations lie in an admissible range (step VIII in FIG. 3). If this is the case, the conditioning is continued by resuming the FFA metering.

Figure 2:
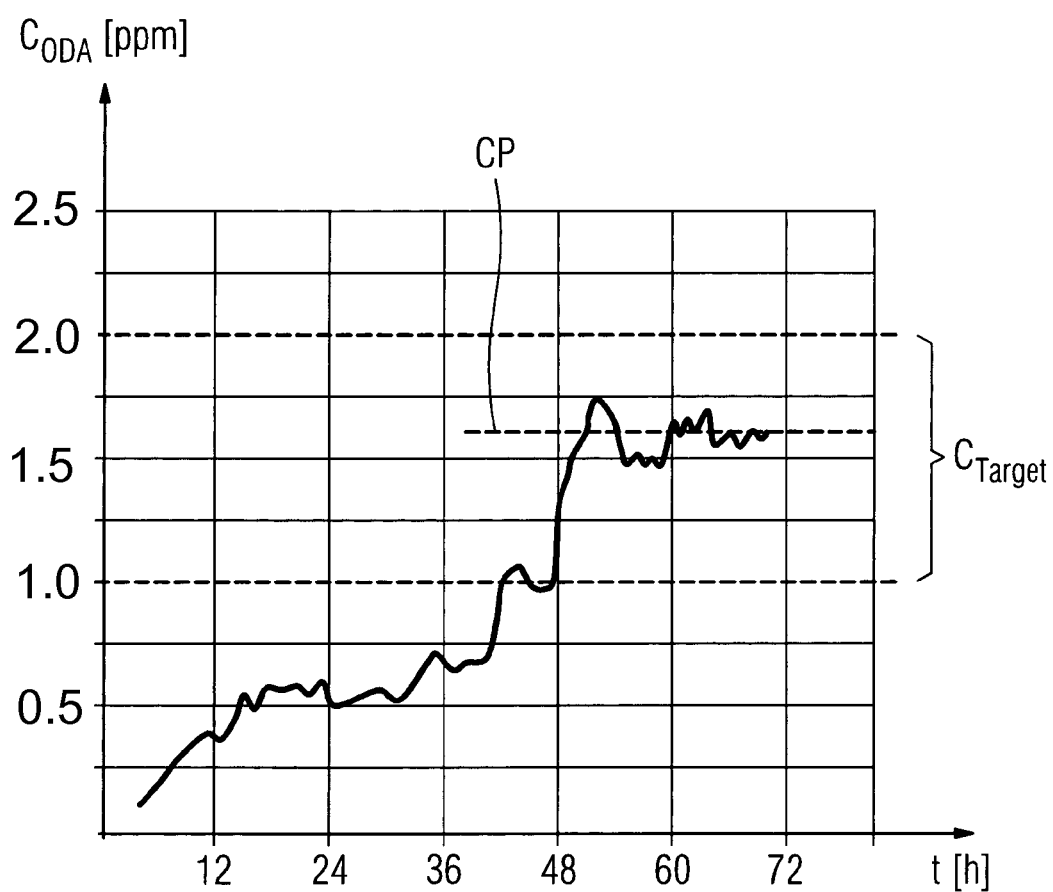
FIG. 2 shows a diagram which reproduces the time profile of the concentration of ODA in the steam generator feed water due to ODA metering.

The concentration of ODA in the aqueous phase is regulated by appropriate metering rates in such a way that this value, practically until the end of the method, does not exceed an upper absolute safety limit of 2 ppm, preferably 1.5 ppm. As a result, this prevents too strong a mobilization of impurities, which goes beyond the set limits, or a no longer controllable massive ODA precipitation from occurring. It also ensures that no unwanted massive ODA deposits are formed. In so doing, metering is such that initially there is a low ODA concentration, which only rises to a target concentration of above 1 ppm, at most up to 1.5 ppm or 2 ppm ($C_{Target}$ in FIG. 2), toward the end of the process. The addition preferably continues until the ODA concentration with increasing tendency has reached the maximum values of 2 ppm or 1.5 ppm (step VI in FIG. 3).

In order to identify when a complete substantially monomolecular film is formed on the surfaces, the concentration profile of the ODA concentration is observed at an unchanging ODA metering rate. If the equilibrium concentration of the FFA is reached at a plurality of measurement points, preferably at all measurement points M1 to M3, i.e., if an unchanging or slightly falling FFA concentration is to be observed (step V in FIG. 3), the time has been reached to end the ODA metering-in or the conditioning method (step VI in FIG. 3; line CP in FIG. 2). The unchanging or sinking ODA concentration toward the end of forming the film could be traced back to the fact that the formation of ODA double and multiple layers is favored for kinetic and/or thermodynamic reasons and therefore occurs more quickly than the initial film formation on the metallic surfaces of the WSC 1.

The ODA film applied to the surfaces of the WSC can lose or reduce its effectiveness over time, for example by virtue of it in part detaching from surfaces or for instance it being subjected to thermal or chemical decomposition processes. It is therefore expedient to undertake a refresh conditioning at a given time. To this end, permanent monitoring of the work medium for the presence of corrosion products, i.e. products connected with the formation of oxidation layers, for example metal ions originating from the component materials of the WSC, is expedient. As soon as it is possible to identify a (significant) increase of corrosion products (step X in FIG. 3), a conditioning of the type described above is put into motion.

The following summarizes and lists the various steps illustrated in the flowchart of FIG. 3.

Step I Start of FFA conditioning
Step II Process monitoring
FFA concentration (M1-M3 in FIG. 1)
Control parameters as per installation specification
Step III Limits of control parameters reached?
Step IV Target concentration of FFA reached at M1?
Step V Equilibrium concentration of FFA reached over M1-M3?
Step VI End of FFA conditioning
Step VII Interrupt metering, purging
Step VIII Values of the control parameters in an admissible range?
Step IX Process monitoring of corrosion products
Step X Increase in the concentration of corrosion products?

The invention claimed is:

1. A method of cleaning and conditioning a circulatory system of a power plant, the method comprising:
    adding an amine as a film-forming agent to a work medium circulating in the circulatory system, for the film-forming agent to form a hydrophobic film on surfaces of the circulatory system;
    monitoring a concentration of the film-forming agent by conducting measurements at a measurement point during a duration of the method;
    terminating the step of adding the film-forming agent when the concentration of the film-forming agent in the work medium has reached a value between 1 ppm and 2 ppm at the measurement point; and
    aborting a metering-in of the film-forming agent if the concentration of the film-forming agent at a constant metering rate remains constant at a plurality of measurement points.

2. The method according to claim 1, which comprises terminating the metering-in of the film-forming agent with the concentration of the film-forming agent has reached a value between 1 ppm and 1.5 ppm.

3. The method according to claim 1, wherein the circulatory system is a water/steam circuit with a two-phase region and with a one-phase region, and the method comprises carrying out the measurement of the concentration of the film-forming agent at at least one measurement point in a two-phase region and at at least one measurement point in a one-phase region of the water/steam circuit.

4. The method according to claim 1, which comprises carrying out the method steps during a power operation of the power plant.

5. The method according to claim 1, which comprises carrying out the method in a nuclear power plant.

6. The method according to claim 1, wherein the film-forming agent is a monoamine with a hydrocarbyl comprising 8 to 22 carbon atoms.

7. The method according to claim 6, wherein the film-forming agent is octadecylamine (ODA).

8. The method according to claim 1, which comprises measuring a concentration of at least one impurity contained in the work medium during the duration of the method and modifying the concentration of the film-forming agent depending on the concentration of the impurity.

9. The method according to claim 8, which comprises reducing a metering rate of the film-forming agent in the case of an increase in the concentration of the at least one impurity.

10. The method according to claim 8, which comprises interrupting the metering-in of the film-forming agent if the concentration of the at least one impurity approaches a threshold limit.

11. The method according to claim 8, wherein the circulatory system comprises a steam generator, and the method comprises at least partly removing the at least one impurity from the circulatory system by blowing down the steam generator.

12. The method according to claim 11, which comprises blowing down the steam generator directly following an interruption of the metering-in of the film-forming agent.

* * * * *